J. PAGIN.
Grain-Binders.
No. 217,139.
Patented July 1, 1879.
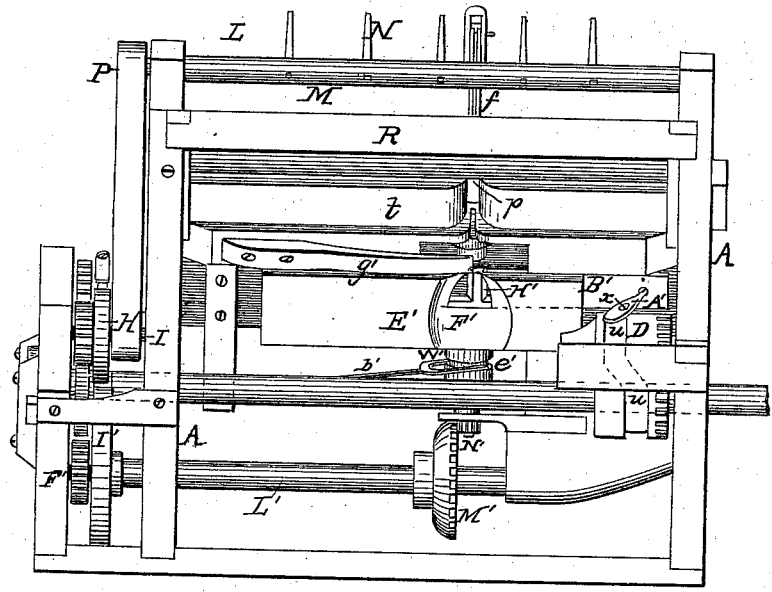
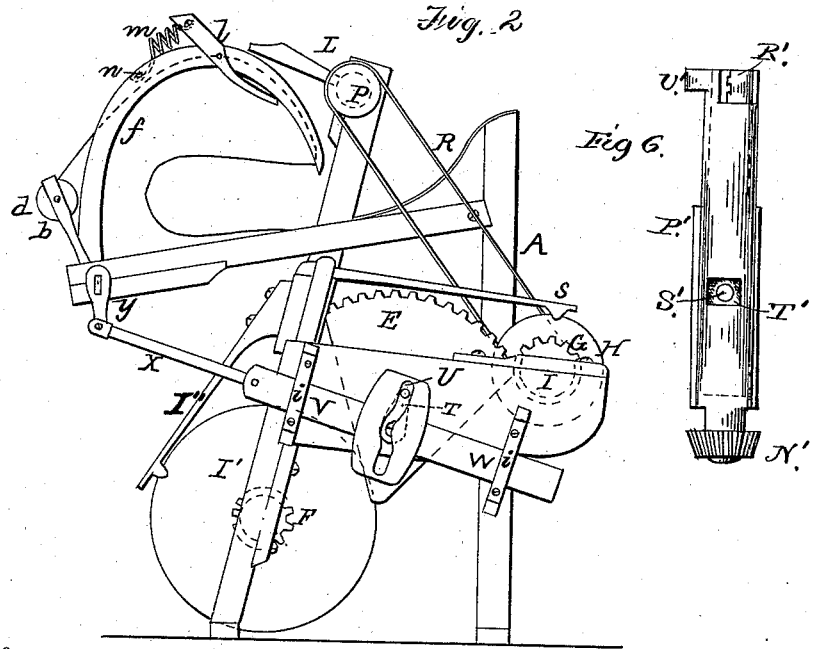
Witnesses
Chas. P. Gill
Willis B. Magruder
Inventor
Joel Pagin
by his attys.
Cox and Cox 2 Sheets—Sheet 2.
J. PAGIN.
Grain-Binders.
No. 217,139. Patented July 1, 1879.
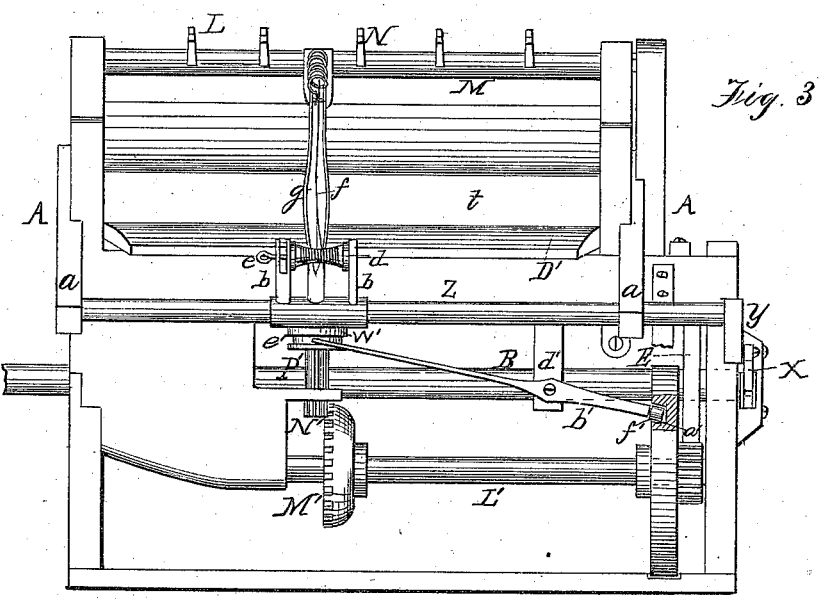
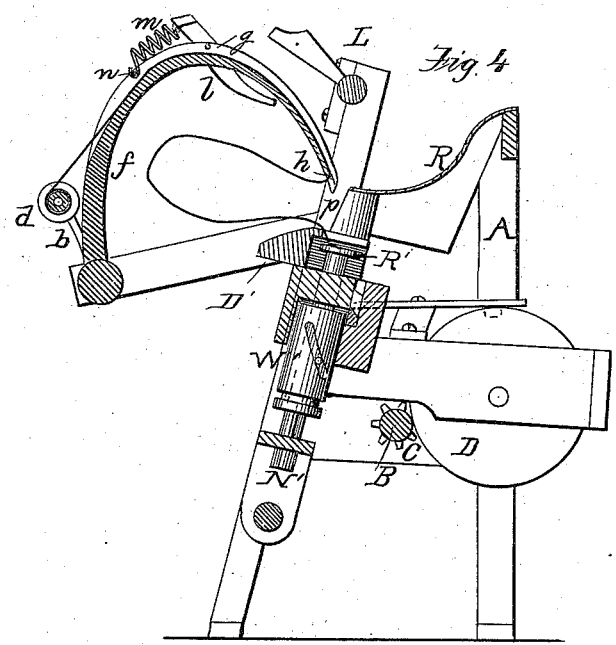
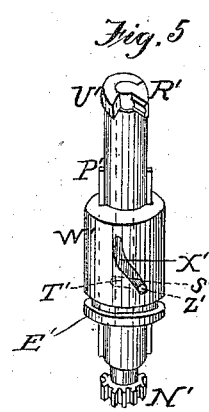
Witnesses:
Chas. C. Gill
Willie B. Magruder
Inventor
Joel Pagin
by his Attys.
Cox and Cox

UNITED STATES PATENT OFFICE.

JOEL PAGIN, OF WASHINGTON PRAIRIE, IOWA.

IMPROVEMENT IN GRAIN-BINDERS.

Specification forming part of Letters Patent No. 217,139, dated July 1, 1879; application filed May 16, 1877.

*To all whom it may concern:*

Be it known that I, JOEL PAGIN, of Washington Prairie, in the county of Winneshiek and State of Iowa, have invented a new and useful Improvement in Grain-Binders, of which the following is a specification, reference being had to the accompanying drawings.

The invention relates to an improvement in grain-binders; and consists in the mechanism hereinafter described, the object being to furnish a suitable means for binding grain.

Figure 1 is a rear-plan view of a device embodying the elements of the invention. Fig. 2 is an end view of same. Fig. 3 is a front elevation. Fig. 4 is a central vertical transverse section, and Fig. 5 is a detached perspective view of the twister. Fig. 6 is a detached perspective view of the shaft P', with the sleeve W' removed.

In the accompanying drawings, A represents the frame of the binder, which is properly braced, and is furnished at about its center with the horizontal shaft B, provided, if desired, on one end with a belt-wheel, (not shown,) whereat power is applied, and near the said wheel with the cogs C, which mesh with the teeth constructed on the outer edge of the wheel D, and thereby communicate motion to it in the operation of the machine.

Near the other end of the shaft B is rigidly secured the segmental gearing E, the center of which is midway between the cog-gear wheels F G, which are caused to revolve at regular alternate intervals by the gearing E coming in contact with them.

The gear-wheel G is immovably secured on its axle with the wheel H and band-wheel I, all of which are connected, and consequently have a corresponding motion.

In the upper extremity of the frame A is provided the rake L, which has a rotary movement, and consists of the horizontal shaft M and teeth N. To one end of the shaft, beyond the frame, is secured the band-wheel P, which is connected with the wheel I by a driving-belt, whereby motion is communicated from the main shaft B, through the gearing E and G, to the rake, the purpose of which will be set forth hereinafter.

In juxtaposition to the rake L the frame A is furnished with the concave inclined platform R, whereon the grain is placed and then brought to a suitable position by the rake preparatory to binding.

To the frame A, opposite the wheel H, which is provided with one or more notches on its periphery, is secured one end of the bar-spring S, the other end of which is provided with a stud and impinges upon the periphery of the said wheel as it revolves, and thereby prevents the momentum of the wheels and belt rotating the rake after the gearing E has passed the wheel G.

On the extremity of the shaft B, opposite the end where power is applied, is secured the crank T, the short arm of which is furnished with a friction-wheel and moves in the cam U, which is provided with arms V W. In the outer end of the arm V is loosely pivoted one end of the driving-rod X. The other end, extending forward, is likewise pivoted to the lower extremity of the crank Y, which is rigidly attached to the end of the horizontal shaft Z. This shaft is secured in bearings in the hangers $a$, and is provided at a suitable point on its surface with the standards $b$, between which the spool $d$ is placed on the spindle $e$. The upper end of one of the standards is slotted, as shown, so as to form a spring for regulating the tension of the spool.

About midway between the standards $b$ is rigidly secured the arm $f$, which is in the contour of a semicircle, and is grooved along its outer periphery, as shown at $g$. Near the forward or pointed end of the arm is constructed the aperture $h$, for the reception of the wire or cord as it passes from the spool $d$ through the groove $g$.

Now, it is obvious that when the shaft B is rotated the short arm of the crank T has a corresponding movement in the cam U, thereby alternately extending and retracting the arms V W, which slide in casings $i$, and driving-rod X, which communicates to the crank Y and shaft Z a semi-rocking motion, and, as the arm $f$ is rigidly secured to the shaft, it is evident that it is either raised or lowered according to the movement of its support.

The slotted heel $l$ is pivoted upon the arm $f$ a proper distance from its ends, and has its upper portion secured to a spring, $m$, which is fastened to the arm by the pivot $n$, and the tension of which causes the lower end of the heel to bear against the under surface of the arm $f$ when it is elevated; but when depressed, and its front end passes through the slot $p$ formed in the concave platform R and its inclined support $t$, the tension of the spring is overcome, and the lower edge of the heel rides down the said support immediately in front of the slot and strikes the auxiliary platform D', where it retains the wire from the spool $d$, as will be more fully described hereinafter.

The guide-slot $u$ is constructed in the periphery of the wheel D, as shown, and is of sufficient size to receive the stud $x$, which is formed with or secured upon the lower surface of the bar A', which is pivoted about its center, and has its forward end set in a socket in the sliding catch B'. Thus it is obvious that when the wheel D revolves the bar A' has a vibratory motion, and causes the catch B' to slide accordingly.

Beneath the platform R, and to the rear of the auxiliary platform D', is rigidly secured the bar E', which is recessed at F' immediately beneath the slot $p$. The sides of the recess are inclined, as shown, the distance between them being greater at their base than at their upper ends, and are provided to retain the wire when it comes in contact with them in the operation of binding grain. The front upper portion of the bar E' is provided with a recess, which acts as a guide for the sliding catch B', which is simply a bar having suitable recesses H', the object of which will be specified hereinafter.

The wheel I' is rigidly connected with the gear-wheel F upon the horizontal shaft L', which receives its motion from the gearing E, acting upon the said wheel F.

The wheel I' is provided with one or more notches on its periphery, and is furnished with the bar-spring cap I'', which is similar to and for the same purpose as the spring-cap S, before mentioned.

At a suitable position upon the shaft L' is secured the surface gear-wheel M', the teeth of which engage the pinion N', furnished upon the lower end of the vertical shaft P', which extends upward to a point immediately beneath the auxiliary platform D', where it is provided with the head of the twister R', the body of which extends downward through a central aperture in the shaft P', and is furnished with a transverse aperture, S', in juxtaposition to the elongated apertures T' in the said shaft.

Upon the upper end and to one side of the shaft P' is formed the flange U', which corresponds with and is in close relation to the twister-head, which is grooved upon the part facing the flange, to receive and securely retain the wire.

The sleeve W' is mounted upon the shaft P' in suitable guides to insure a strictly-vertical movement, and is furnished on opposite sides with the inclined guide-slots X', in which is inserted the pin Z', which extends through the apertures S' T'.

Upon the inside face of the wheel I' is suitably formed the guide $a'$, in which the shank end of the forked rod $b'$ is placed, being therein provided with a wheel to reduce friction. The rod $b'$ is pivoted on the hanger $d'$, and has its forked ends set in the annular groove $e'$, constructed in the lower portion of the sleeve W'.

It is obvious that when the gear-wheel F is rotated the wheel I' receives a corresponding movement, and as it revolves the shank end of the rod $b'$ is compelled to accommodate itself to the contour of the groove $a'$. It is evident therefore that when the rod shall come in contact with the incline $f'$ of the groove its shank end will be forced downward and forked end elevated, thereby forcing the sleeve W' vertically upward, when the ends of the pin Z' will ride down the inclined slots X', and as the sleeve cannot revolve upon the shaft P' the pin is caused to have a slight rotary movement and carries the twister R' with it. Thus if the grooved face of the twister were in close relation to the face of the flange U', and the sleeve then elevated, the pin would ride down the slots X', at the same time revolving, and the twister R' rotating would carry the grooved face of the twister-head away from the flange U', leaving an open space, in which the wire as it protrudes through the slot $p$ is placed.

When the incline $f'$ has been passed the rod $b'$ and sleeve W' will resume their former positions. This will reverse the movement above described, and the twister-jaws will close and thereby cut the wire which was held by them, after which the obverse motion will again take place and the jaws be again opened.

The wire, after being passed along the groove in the arm $f$ and through the aperture $h$, is looped or bowed, as shown in Fig. 4, the curvature of the same protruding toward the front of the machine and inserted through the slot $p$. The wire, near its end, is then placed in the space between the jaws of the twister. The grain to be bound is now placed upon the curved platform R, and the machine set in motion. This causes the revolution of the rake L, which sweeps the grain off the platform R, down on the auxiliary platform D', against the bowed wire, when the arm $f$ falls forward into and through the slot $p$, carrying the wire, which is now on the front portion of the sheaf, with it, the heel $l$ in the meantime pressing the wire and retaining it at the base of the said slot $p$. Thus the wire now completely surrounds the grain.

When the arm $f$ is protruded through the said slot the wire automatically falls between the jaws of the twister with the end of the same which was therein placed at the beginning of the operation. The jaws now close by the movement of the sleeve W' before mentioned, thereby cutting the wire and retaining both its ends, and commence to revolve, twisting the ends of the wire, when in the regular operation of the machine the sleeve W' rises and opens the twister-jaws, as before mentioned, loosening the wire and allowing the bound sheaf to be removed or swept off by the rake.

After the wire has been cut by the twister the spring-bar $g'$, which impinges upon the upper surface of the arm $f$ when depressed, prevents it from being jerked out of place, while the end of the main piece of wire falls down in one of the recesses of the sliding catch B', which carries it against the edge of the recess F', and there retains it until the arm $f$ rises and redescends, which causes the wire to again bow, as before, at which time the movement of the catch is reversed and the wire taken up by the twister and treated as before.

When the arm is elevated, the catch holding the end of the wire, this gradually unwinds from the spool $d$, and permits the bow or curve to be formed for receiving another sheaf.

The machine is kept in constant motion, and additional grain is fed as soon as one lot is bound and removed.

What I claim as my invention, and desire to secure by Letters Patent, is—

1. The shaft B, provided with cogs C, in combination with the wheel D, constructed with guide $u$, bar A', sliding catch B', having notches H', and bar E', furnished with recess F', substantially as specified.

2. The shaft B, provided with segmental gearing E, in combination with the gear-wheel G, notched wheel H, bar-spring cap S, and rake L, as and for the purpose set forth.

3. The shaft B, furnished with the segmental gearing E, in combination with the gear-wheel F, notched wheel I', bar-spring cap I'', shaft L', wheel M', pinion N', and shaft P', substantially as specified.

4. The shaft Z and standards $b$, the latter slotted to impart a spring-tension to the spool $d$, mounted upon the spindle $e$, in combination with the arm $f$, substantially as set forth.

5. The wheel I', provided with the guide $a'$, in combination with the forked bar $b'$, the sleeve W', provided with the slot $e'$ and groove X', the shaft P', stud Z', pinion N', and face-wheel M', substantially as set forth.

6. The shaft P' and apertures S', in combination with the grooved twister-jaw R', aperture T', and sleeve W', furnished with guide-slots X' and pin Z', substantially as set forth.

In testimony that I claim the foregoing improvement in grain-binders, as above described, I have hereunto set my hand this 19th day of April, 1877.

JOEL PAGIN.

Witnesses:
J. B. B. BAKER,
A. E. ROBBINS.